(12) United States Patent
Ryan

(10) Patent No.: US 8,512,106 B2
(45) Date of Patent: Aug. 20, 2013

(54) FISH PROCESSING SYSTEM AND METHOD

(75) Inventor: Robert M. Ryan, Woodway, WA (US)

(73) Assignee: RYCO Equipment, Inc., Mountlake Terrace, WA (US)

(*) Notice: Subject to any disclaimer, the term of this patent is extended or adjusted under 35 U.S.C. 154(b) by 0 days.

(21) Appl. No.: 13/357,486

(22) Filed: Jan. 24, 2012

(65) Prior Publication Data

US 2013/0040544 A1   Feb. 14, 2013

Related U.S. Application Data

(60) Provisional application No. 61/521,259, filed on Aug. 8, 2011, provisional application No. 61/538,752, filed on Sep. 23, 2011.

(51) Int. Cl.
*A22C 25/14* (2006.01)

(52) U.S. Cl.
USPC .......................................... 452/121; 452/122

(58) Field of Classification Search
USPC ........................... 452/106, 107, 120, 121, 122
See application file for complete search history.

(56) References Cited

U.S. PATENT DOCUMENTS

| | | | |
|---|---|---|---|
| 3,925,846 A | 12/1975 | Leander | |
| 4,091,506 A * | 5/1978 | Soerensen et al. | 452/116 |
| 4,356,596 A * | 11/1982 | Gundersen et al. | 452/117 |
| 4,365,387 A * | 12/1982 | Hartmann et al. | 452/161 |
| 4,563,793 A | 1/1986 | Ryan | |
| 4,630,335 A | 12/1986 | Claudon | |
| 5,026,318 A * | 6/1991 | Jahnke | 452/116 |
| 5,106,334 A * | 4/1992 | Kristinsson | 452/106 |
| 5,167,570 A | 12/1992 | Ryan | |
| 5,352,152 A | 10/1994 | Claudon | |
| 5,413,524 A | 5/1995 | Yoshida | |
| 5,735,735 A * | 4/1998 | Hahn et al. | 452/119 |
| 5,980,376 A * | 11/1999 | Grosseholz et al. | 452/116 |
| 6,368,203 B1 * | 4/2002 | Puretz | 452/81 |
| 7,179,163 B1 * | 2/2007 | Vedsted et al. | 452/121 |
| 7,427,229 B2 * | 9/2008 | Grosseholz et al. | 452/106 |
| 7,559,830 B2 * | 7/2009 | Solberg et al. | 452/121 |
| 7,828,635 B2 * | 11/2010 | Paulsohn et al. | 452/116 |
| 7,988,542 B1 * | 8/2011 | Yamase et al. | 452/150 |

* cited by examiner

*Primary Examiner* — David Parsley
(74) *Attorney, Agent, or Firm* — Seed IP Law Group PLLC

(57) ABSTRACT

Methods and systems for processing fish are provided which enable cutting of the fish and removal of the viscera without damage to either the viscera or the remaining fish product. The systems may include an adjustable cutting device to cut the belly in a particularly unobtrusive manner and/or an adjustable gutting device to sever a gullet of the fish from the fish body and to gather and remove the viscera without significant damage to the viscera or the remaining fish product. Extractors for severing the connection between the gullet and the fish are also provided to assist in removal of the viscera, including the gonads. Vacuum head assemblies for cleaning a cavity of the fish after the viscera is removed are also provided.

28 Claims, 8 Drawing Sheets

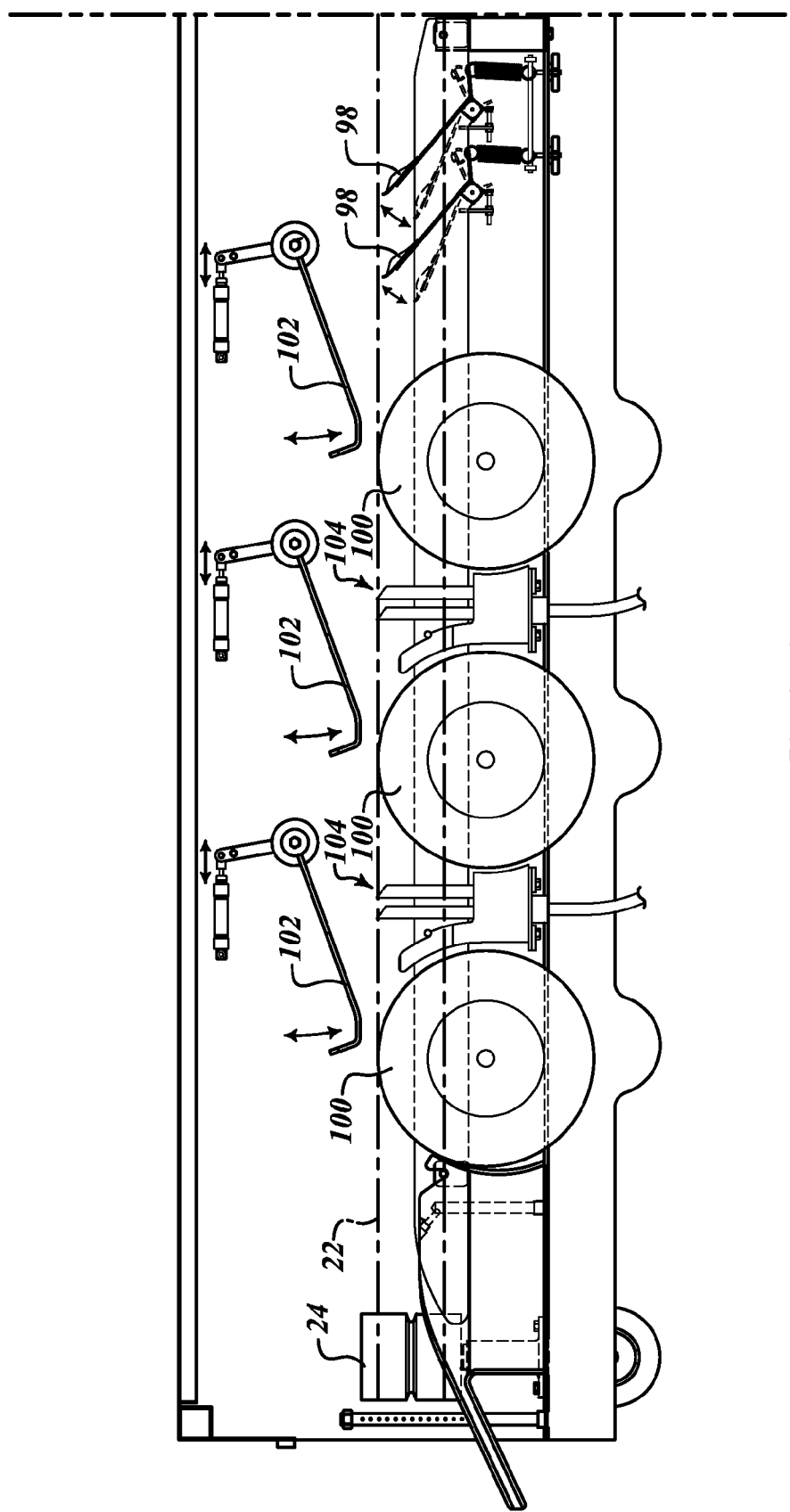

FISH PROCESSING SYSTEM AND METHOD

CROSS-REFERENCE TO RELATED APPLICATIONS

This application claims the benefit under 35 U.S.C. §119(e) of U.S. Provisional Patent Application Nos. 61/521,259, filed Aug. 8, 2011 and 61/538,752, filed Sep. 23, 2011, the entire disclosures of which are herein incorporated by reference for all purposes.

BACKGROUND

1. Technical Field

This disclosure generally relates to systems and methods for processing fish, and more particularly to systems and methods for cutting the belly of a fish, severing the gullet connection to the body of the fish and removing the viscera from the body without significant damage to the body or the viscera.

2. Description of the Related Art

In some fish products, the head is removed at the gills, leaving a hard cartilage structure on the head end of the fish called the collar. The viscera, including the gonads (roe or milt) are removed, the kidney membrane is cut and the kidney is removed with water sprays and brushes. In the salmon industry, this product is called a head and gut product which is a valuable commodity. In recent years the value of intact roe (female gonads) has also increased making it a valuable commodity as well. However, if the roe skein is cut or otherwise damaged, the value of the roe is greatly diminished. Some markets also value the undamaged milt (male gonads).

In many fish, including salmon, the gullet is attached only to the collar, and the viscera are firmly attached only to the gullet and the anal vent or anus. In most fish caught in saltwater, where the highest volume of commercial fish is caught, the connection of the viscera to the vent is not strong, and is easily broken when cleaning the fish. Disconnecting the gullet from the collar, however, is significant to proper cleaning of most fish, and significant to avoiding damage to the gonads.

Machines for cutting open the belly, removing the viscera and cleaning the belly cavity have been in use for many years. Some machines require detaching the gullet from the body prior to processing. Some allow the gullet to be intact before processing, but do not reliably remove the gullet. When the gullet is not cut free or does not break free from the body during processing, the remainder of the viscera does not separate from the fish, the valuable roe or milt is damaged and the fish is not cleaned properly, thereby increasing labor costs and downgrading value of the fish product.

Example systems and methods for processing fish are described in U.S. Pat. Nos. 3,925,846; 4,563,793; 4,630,335; 5,352,152; and 5,413,524.

While known systems have been generally effective to process fish, the systems suffer from various deficiencies and shortcomings, such as, for example, inadvertent damage to the gonads or remaining fish structure during processing which diminishes the value of the processed fish and/or recovered fish parts. As another example, many known systems are incapable of effectively adjusting to variations in the size, shape and/or firmness of the fish being processed in a reliable and repeatable manner.

BRIEF SUMMARY

The systems and methods of processing fish described herein provide for the efficient and reliable removal the viscera from a fish, with the collar intact, without damage or with minimal damage to the viscera or the fish. This can be accomplished without regard to significant variations in the fish size, shape and/or firmness, and also without regard to individual variations in arrangement and location of the internal viscera of the fish. The systems and methods may further provide particularly effective cleaning of a cavity of the fish after the viscera is removed.

In some embodiments, an extractor may be optimally positioned to enter the fish below the backbone and above the gullet thereof, yet exit the fish at the anal vent without impalement. This may be accomplished, for example, with an actuator or other device which positions the extractor at a first height for when the extractor enters the fish and moves the extractor to a second height to exit the anal vent without significant damage. In some embodiments, a profile of a tip of the extractor may be configured to severe the gullet from the collar in a particularly reliable manner without significant damage to the gullet or other structures of the fish. According to some embodiments, when the extractor enters the fish body, movable wing members positioned below the extractor may open to gather the viscera. After the extractor moves to exit the fish or during the movement of the extractor, the wing members may close to assist in severing the connection between the viscera and the fish. Movement of the extractor and the opening and closing of the wing members may be controlled to move at the same or different times during a gutting operation. Movement of the extractor and/or the wing members may be controlled or triggered by movement of tension rollers engaging conveyor belts which may be transporting the fish, a lever or other mechanism that senses or contacts the top of the fish during transport, actuators (e.g., air cylinders) coupled to devices that sense or contact the collar or another part of the fish during transport or other sensing and control devices positioned along the transport path of the fish through the fish processing system.

In some embodiments, a blade for cutting the belly of the fish may be movably coupled to the fish processing system to enable the blade to track a profile of the fish during a cutting operation. A guide may be coupled to the blade to move in unison therewith and the guide may be positioned to be inserted into a body of the fish to guide the fish across the blade during the cutting operation. A linkage mechanism may be coupled to the guide and configured to enable the guide to move in response to the profile of the fish without substantial angular rotation of the guide as the guide moves through a length of the fish during the cutting operation. For instance, the linkage mechanism may include links forming a parallelogram such that an angular orientation of a floating link and components fixedly coupled thereto (e.g., the guide) is maintained substantially constant throughout movement of the linkage mechanism.

A fish processing system may be summarized as including a blade to incise a belly of a fish when the fish is transported from an upstream location across the blade and a gutting device positioned downstream of the blade, the gutting device including an extractor movably coupled to the fish processing system to selectively position a tip of the extractor relative to anatomy of the fish during a gutting operation. The extractor may be configured to enter the fish at a first height below a backbone and above a gullet of the fish and exit the fish at a second height that is substantially aligned with an anal vent of the fish. The extractor may be configured to automatically move from the first height to the second height during an interval in which the tip of the extractor moves through a length of the fish during the gutting operation. The fish processing system may further include an actuator coupled to the extractor to move the extractor between the first height and the second height during the gutting operation. The fish processing system may further include a sensor positioned to sense a location of the fish during the gutting operation and trigger the actuator to move the extractor. When viewing the extractor in a direction along a longitudinal length thereof, a profile of the tip of the extractor may include a central portion disposed between opposing downwardly open grooves. The opposing downwardly opposing grooves of the extractor may be positioned to assist in severing a gullet of the fish from a collar of the fish without significant damage to the collar.

The gutting device may further include a pair of opposing wing members configured to move between an open configuration and a closed configuration. The wing members may be configured to enter a fish in the closed configuration and thereafter move to the open configuration to gather viscera of the fish. The wing members may be further configured to move from the open configuration toward the closed configuration to assist in severing the viscera from the fish prior to when the wing members exit the fish. Movement of the wing members may be coordinated with movement of the extractor. The wing members may be configured to transition from the open configuration to the closed configuration at about the same time when the extractor moves from a first height to a second height lower than the first height. The wing members may be configured to transition from the open configuration to the closed configuration after the extractor moves from a first height to a second height lower than the first height. The wing members may be configured to transition from the closed configuration to the open configuration after the extractor enters the fish and a leading edge of each respective wing member is near a collar of the fish.

The fish processing system may further include a vacuum head assembly positioned downstream of the gutting device to clean a cavity of the fish after the gutting operation. The vacuum head assembly may include at least one flexible suction member located to flex in response to the anatomy of the fish as the fish moves across the vacuum head assembly during a cleaning operation. The vacuum head assembly may further include a fluid jet passage to discharge fluid into the cavity of the fish as the fish moves across the vacuum head assembly during the cleaning operation. The vacuum head assembly may further include a body having a stop portion to limit movement of the at least one flexible suction member during the cleaning operation. The vacuum head assembly may include at least two sequentially positioned suction members to clean the cavity of the fish during the cleaning operation.

A fish processing system may be summarized as including a blade to incise a belly of a fish when the fish is transported from an upstream position across the blade; a guide positioned to be inserted into a body of the fish to guide the position of the fish as the belly is cut by the blade during a cutting operation; and a linkage mechanism coupled to the guide and the blade, the linkage mechanism configured to enable the guide to move in response to a profile of the fish without substantial angular rotation of the guide as the guide moves through a length of the fish during the cutting operation. The linkage mechanism may be configured to limit the angular rotation of the guide to five degrees or less as the guide moves through the length of the fish during the cutting operation. The linkage mechanism may be configured to maintain the guide at the same spatial orientation as the guide moves through the length of the fish during the cutting operation. The linkage mechanism may include a pair of links which operate in a parallel relationship throughout movement of the guide during the cutting operation.

A fish processing system may be summarized as including a blade to incise a belly of a fish when the fish is transported from an upstream location across the blade; and a gutting device positioned downstream of the blade, the gutting device including a pair of opposing wing members movable between an open configuration and a closed configuration, the wing members configured to enter the fish in the closed configuration and thereafter move to the open configuration to gather viscera of the fish during a gutting operation. The wing members may be further configured to move from the open configuration toward the closed configuration to assist in severing the viscera from the fish prior to when the wing members exit the fish. Movement of the wing members may be coordinated with movement of an extractor of the gutting device which is positioned to sever a gullet from the fish during the gutting operation.

An extractor to separate a gullet from a fish may be summarized as including an elongated base and a leading tip at an end of the elongated base, a profile of the leading tip having a central portion disposed between opposing downwardly open grooves when viewing the profile of the leading tip in a direction along a longitudinal length of the extractor. The opposing downwardly open grooves may be v-shaped. A lower profile section of the central portion may be substantially flat. A lower profile section of the central portion may be arcuate. A lower profile section of the central portion may be concave and an upper profile section of the central portion may be convex. The opposing downwardly opposing grooves may be positioned to assist in severing the gullet of the fish from a collar of the fish without significant damage to the collar.

A vacuum head assembly of a fish processing system may be summarized as including a main body having a suction cavity and at least one flexible suction member coupled to the suction cavity of the main body, the flexible suction member configured to flex in response to anatomy of a fish as the fish moves across the vacuum head assembly during a cleaning operation. The vacuum head assembly may further include a fluid jet passage to discharge fluid into a cavity of the fish as the fish moves across the vacuum head assembly during the cleaning operation. The main body of the vacuum head assembly may include a stop portion to limit movement of the at least one flexible suction member during the cleaning operation. The vacuum head assembly may include at least two sequentially positioned flexible suction members to clean a cavity of the fish during the cleaning operation.

A method of processing a fish may be summarized as including transporting a fish across a blade to cut a belly of the fish during a cutting operation; transporting the fish across a gutting device to remove viscera of the fish with gonads intact during a gutting operation; and manipulating an extractor of the gutting device to pass through the fish at different elevations while transporting the fish across the gutting device during the gutting operation. The method of processing a fish may further include moving wing members of the gutting device between an open configuration and a closed configuration while transporting the fish across the gutting device during the gutting operation to gather and sever the viscera from the fish. The method of processing a fish may further include severing a gullet from the fish at least in part with a leading end of an extractor having a profile which includes a central portion disposed between opposing downwardly open grooves. The method of processing a fish may further include moving a position of the blade via a linkage mechanism in response to a profile of the fish during the cutting operation, the linkage mechanism rigidly coupled to a guide that is configured to trace the profile of the fish without substantial angular rotation of the guide as the guide moves through a length of the fish during the cutting operation. The method of processing a fish may further include passing the fish over a flexible vacuum member to clean a cavity of the fish after the viscera is removed.

BRIEF DESCRIPTION OF THE SEVERAL VIEWS OF THE DRAWINGS

FIGS. 1A and 1B are side elevational views of a fish processing system according to one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with fish processing systems and methods may not be shown or described in detail to avoid unnecessarily obscuring descriptions of the embodiments. For instance, well known conveying systems may be used to transport fish through the various fish processing systems and devices described herein, such as, for example, opposing conveyor belts which are pressed into contact with the fish by tensioning rollers disposed along a fish transport path. Drive and control systems may be provided with the conveyor systems to selectively control a speed with which the belts move and thus a rate at which fish are processed.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1B:
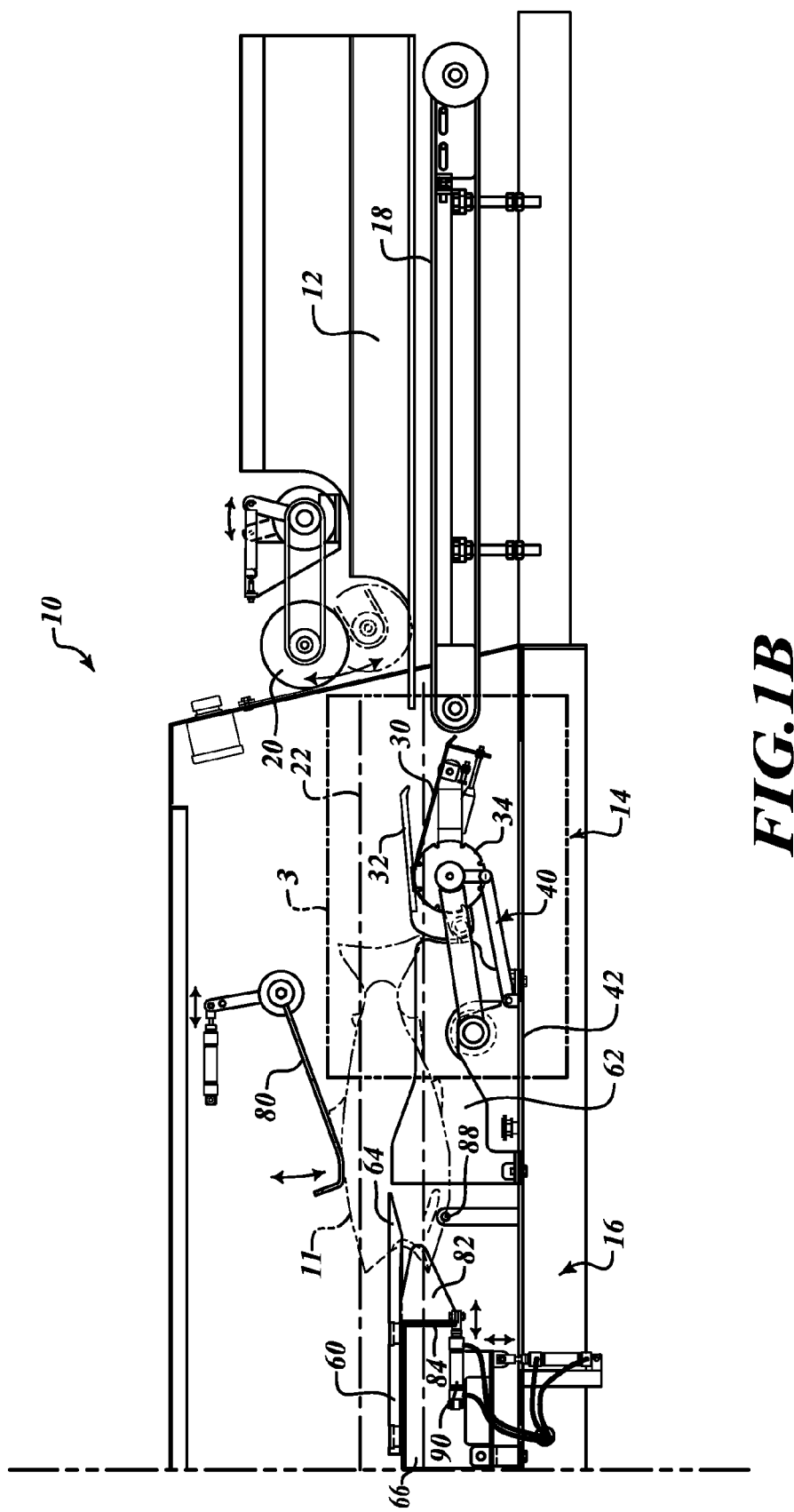
Figure 2:
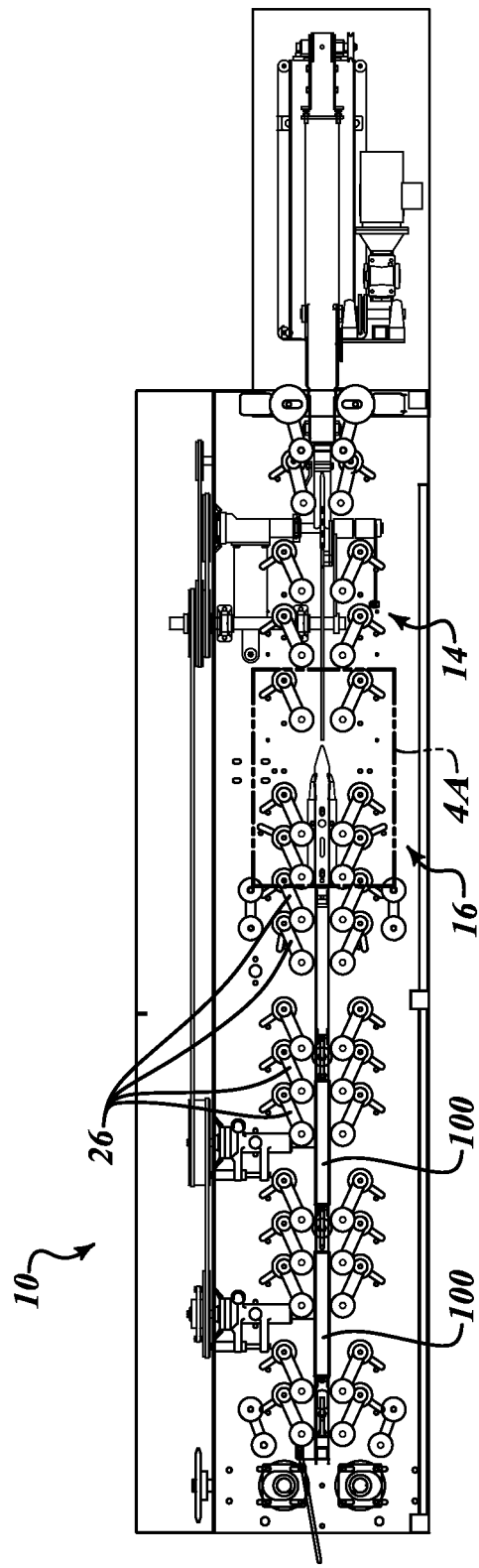
FIG. 2 is a top plan view of the fish processing system of FIGS. 1A and 1B.

FIGS. 1A and 1B show a fish processing system 10 according to one embodiment. The fish processing system 10 includes a fish infeed trough 12 for supporting fish 11 in a generally upright position as the fish 11 are fed via a infeed conveyor belt 18 toward a cutting device 14, a gutting device 16 and other components of the system 10. A guide roller 20 may be provided to engage a back of the fish 11 as the fish 11 progress toward the cutting device 14 and other components of the system. The guide roller 20 may assist in positioning the fish 11 for further transport by vertically aligned conveyor belts 22 on opposing sides of the fish 11. The conveyor belts 22 may be driven by drive pulleys 24 and urged toward a centerline of the system 10 by tension roller assemblies 26 (FIGS. 2, 4 and 6) disposed along a transport path of the fish 11 to accommodate fish 11 of varying size, shape and firmness.

Fish 11 are conveyed from the infeed trough 12 towards the cutting device 14. The cutting device 14 may include a floor plate 30 positioned to support the fish 11 as the fish 11 are sequentially fed over a guide for further processing, such as, for example, a guide rod 32. The floor plate 30 may be flexibly coupled to the cutting device 14 by a spring element or other resilient device 31 to enable the floor plate 30 to flex in response to the fish 11 as the guide rod 32 passes through the fish 11. The floor plate 30 and guide rod 32 interoperate to isolate the meat of the fish belly for cutting and to effectively shield the viscera from damage during the cutting operation.

To further protect the viscera and fish from damage, the guide rod 32 of the illustrated embodiment of FIGS. 1A and 1B is movably coupled to the fish processing system 10 to move relative to the fish 11 as the fish 11 are transported across a blade 34 of the cutting device 14. More particularly, a linkage mechanism 40 couples the blade 34 and guide rod 32 to a base 42 of the fish processing system 10 and enables the blade 34 and guide rod 32 to move in unison in response to a profile of the fish 11. For instance, as the guide rod 32 approaches a tail end of the fish 11 during the cutting operation, the guide rod 32 is led downward by the anatomy of the fish thereby displacing the central axis of the blade 34 which moves in unison with the guide rod 32. The blade 34 and guide rod 32 are suspended in space by the linkage mechanism 40 and move in response to a profile of the fish 11 as the guide rod 32 enters the leading end of the fish 11 and moves through the fish 11. Notably, the end of the cutting operation is characterized by a generally downward motion of the blade 34 and the guide rod 32 with little to no angular rotation of the guide rod 32 relative to a base reference frame of the fish processing system 10, as described in more detail below.

Figure 3:
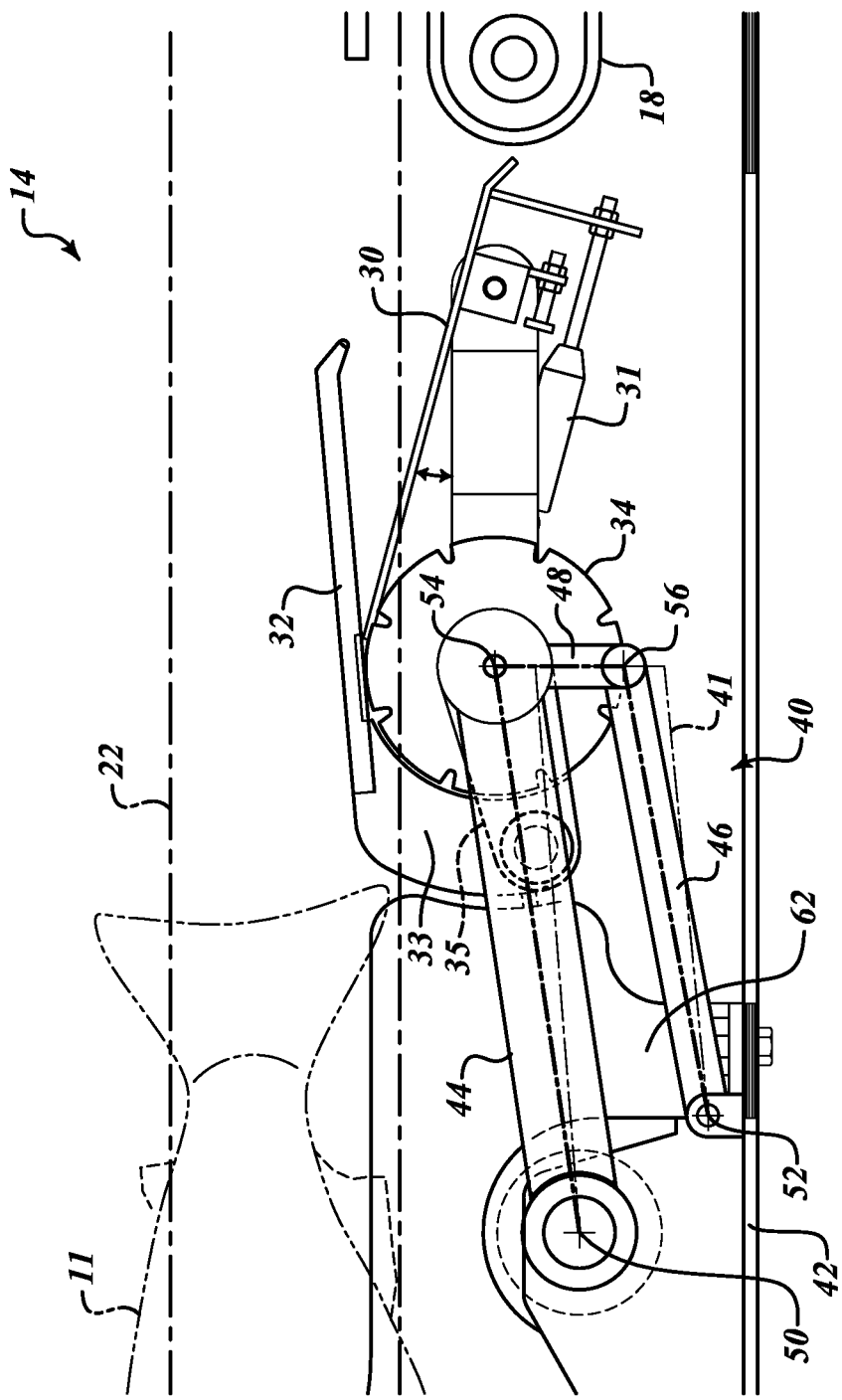
FIG. 3 is a side elevational view of a portion of the fish processing system of FIGS. 1A and 1B showing a cutting device thereof.

As shown in FIG. 3, the linkage mechanism 40 may be a four-bar linkage including three link members 44, 46, 48 rotatably coupled to each other and the base 42 at pivot axes 50, 52 (which define a ground link or fixed link). The link members 44, 46, 48 and pivot axes 50, 52 may be sized and positioned such that the floating link 48 is maintained at a relatively constant angular orientation with respect to a base reference frame during the cutting operation. The guide rod 32, which is coupled to move in unison with the floating link 48 via an intermediate plate 33 and arm structure 35, is thus able to move in response to a profile of the fish 11 without substantial angular rotation of the guide rod 32 as the guide rod 32 moves through the fish 11. In this manner, the guide rod 32 is configured to traverse through the fish 11 in a particularly unobtrusive manner to aid in cutting the belly while minimizing the risk of damage to the viscera, including the gonads.

In some embodiments, the linkage mechanism 40 is configured to limit the angular rotation of the floating link 48 and guide rod 32 to five degrees or less as the guide rod 32 moves through the length of the fish 11 during the cutting operation. In other embodiments, the linkage mechanism 40 is configured to limit the angular rotation of the floating link 48 and guide rod 32 to two degrees or less. In still further embodiments, the linkage mechanism 40 is configured to maintain the guide rod 32 at the same spatial orientation as the guide rod 32 moves through the length of the fish 11. In such embodiments, the grounded links 44, 46 of the linkage mechanism 40 operate in a parallel relationship. In other embodiments, the cutting device 14 of the fish processing system 10 may not include a linkage mechanism 40 altogether. Instead, the guide rod 32 may be fixed relative to the base reference frame or pivotally coupled to the base 42 to rotate through a relatively wide angle of rotation during the cutting operation (e.g., more than ten degrees).

With reference again to FIGS. 1A and 1B, the fish processing system 10 of the illustrated embodiment is configured to feed fish 11 which have been cut along their belly by the cutting device 14 to the gutting device 16 for further processing. More particularly, the fish 11 are fed to the gutting device 16 for removal of the viscera of the fish, including the gonads.

Figure 4:
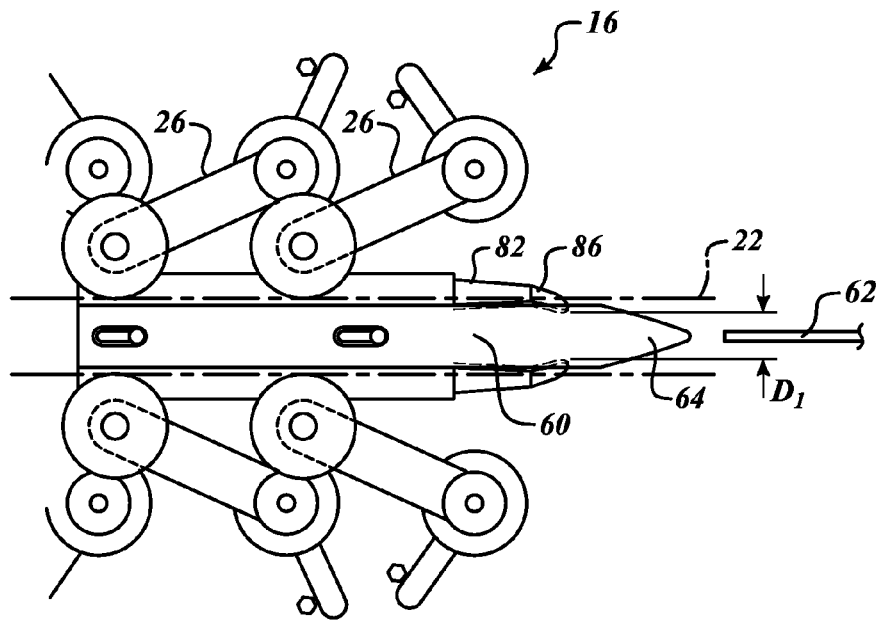
FIG. 4 is a top plan view of a portion of the fish processing system of FIGS. 1A and 1B showing a gutting device thereof in a closed configuration.
Figure 5:
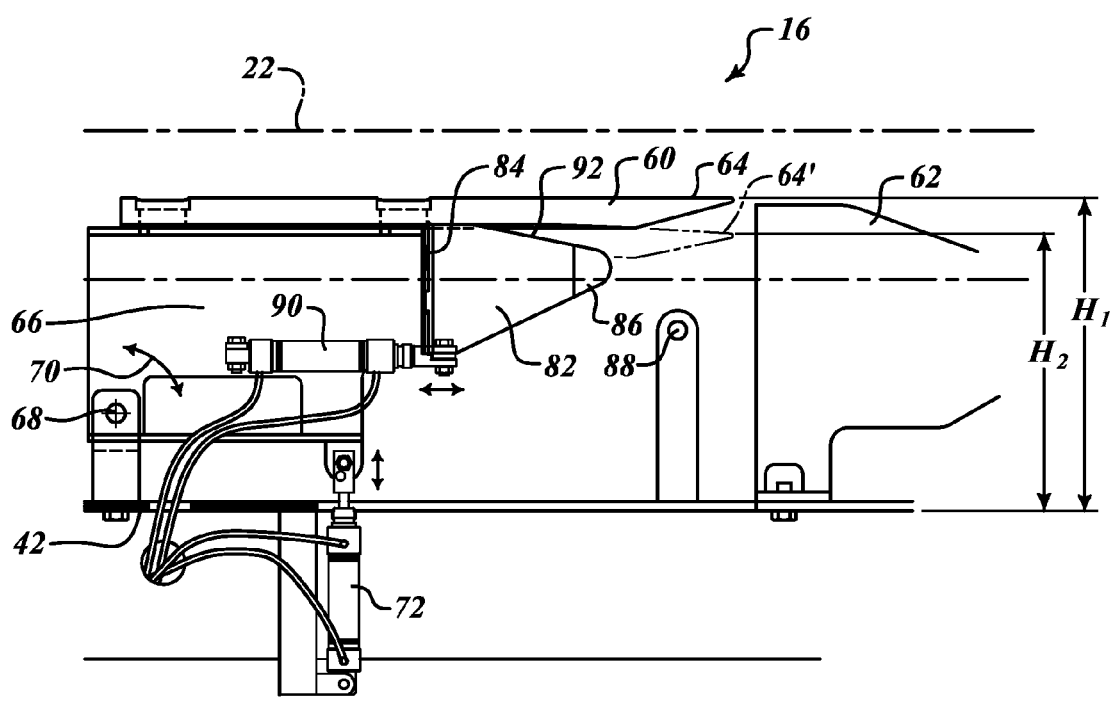
FIG. 5 is a side elevational view of the portion of the fish processing system of FIG. 4.

With reference to FIGS. 4 and 5, the gutting device 16 includes an extractor 60 that is positionable to enter the fish 11 below the backbone and above the gullet of the fish 11. A guide 62 may be positioned upstream of the gutting device 16 to assist in properly aligning the fish 11 with the extractor 60. During operation, the fish 11 pass over the guide 62 after leaving the cutting device 14 and are guided to a predetermined position with respect to the extractor 60, or more particularly, a tip 64 of the extractor 60. As the tip 64 of the extractor 60 enters and passes through the fish 11, the extractor 60 severs the connection between the gullet and the remainder of the fish 11.

The extractor 60 is attached to a frame 66 which is movably coupled to the base 42 of the fish processing system 10 to position the tip 64 of the extractor at different elevations or heights during the gutting operation. For example, in the illustrated embodiment of FIGS. 4 and 5, the frame 66 is pivotably coupled to the base 42 to rotate about an axis of rotation 68, as indicated by the arrows labeled 70. During operation, the tip 64 of the extractor 60 may be positioned at a first height when entering the fish 11 and the tip 64' moved to another height prior to exiting the fish 11 by rotating the frame 66 and hence extractor 60 about the axis of rotation 68. In other embodiments, the frame 66 may be coupled to the base 42 by a linkage mechanism, such as, for example a four-bar linkage mechanism to enable height adjustment of the extractor 60 during the gutting operation. In still further embodiments, the frame 66 may be coupled to the frame to translate linearly, such as, for example, along elongated slots.

Irrespective of the particular arrangement, the extractor 60 is advantageously enabled to move between different heights during the gutting operation. In some embodiments, the extractor 60 may move between different heights in a stepwise manner, and in other embodiments, may move in a continuous manner. For example, as shown in the illustrated embodiment, an actuator 72, such as, for example, a two-position air cylinder, may be coupled between the frame 66 and the base 42 to transition the tip 64 of the extractor 60 at a first height $H_1$ when entering the fish and a second height $H_2$ when exiting the fish 11. Movement of tension rollers engaging conveyor belts 22 which may be transporting the fish 11, a lever or other mechanism that senses or contacts the top of the fish 11 during transport, actuators (e.g., air cylinders) coupled to devices that sense or contact the collar or another part of the fish 11 during transport or other sensing and control devices may be positioned along the transport path of the fish 11 to determine a position of the fish 11 during the gutting operation and trigger the actuator 72 to move the tip 64 of the extractor 60 accordingly. In addition, as shown in FIG. 1B, a hold down device 80 may be provided to bias the fish 11 downwardly during the gutting operation to prevent the fish 11 from inadvertently rising due to the insertion of the extractor 60.

As shown best in FIGS. 4 through 7, the gutting device 16 may further include a pair of wing members 82 to assist in gathering viscera of the fish 11 during the gutting operation and to assist in severing the viscera from the body of the fish 11. The wing members 82 are rotatably coupled to the frame 66 of the gutting device by a hinge 84 or other structure such that the wing members 82 may transition between an open configuration in which the wing members 82 are spread relatively further apart, as illustrated by the distance labeled $D_1$ in FIG. 4, and a closed configuration in which the wing members 82 are relatively closer together, as illustrated by the distance labeled $D_2$ in FIG. 6. The wing members 82 may flare out to spread opposing sides of the fish 11 in a lower region of the fish 11 when entering the same. In addition, the wing members 82 may include a leading end region 86 which extends or tapers toward the centerline of the system 10 to facilitate entry of the wing members 82 in the fish 11 to be processed.

Figure 6:
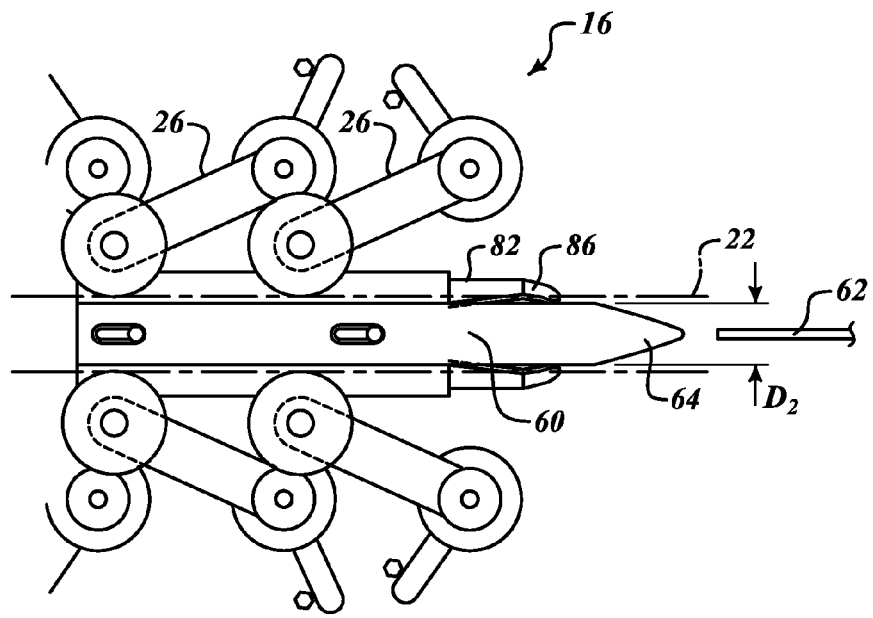
FIG. 6 is a top plan view of a portion of the fish processing system of FIGS. 1A and 1B showing the gutting device thereof in an open configuration.
Figure 7:
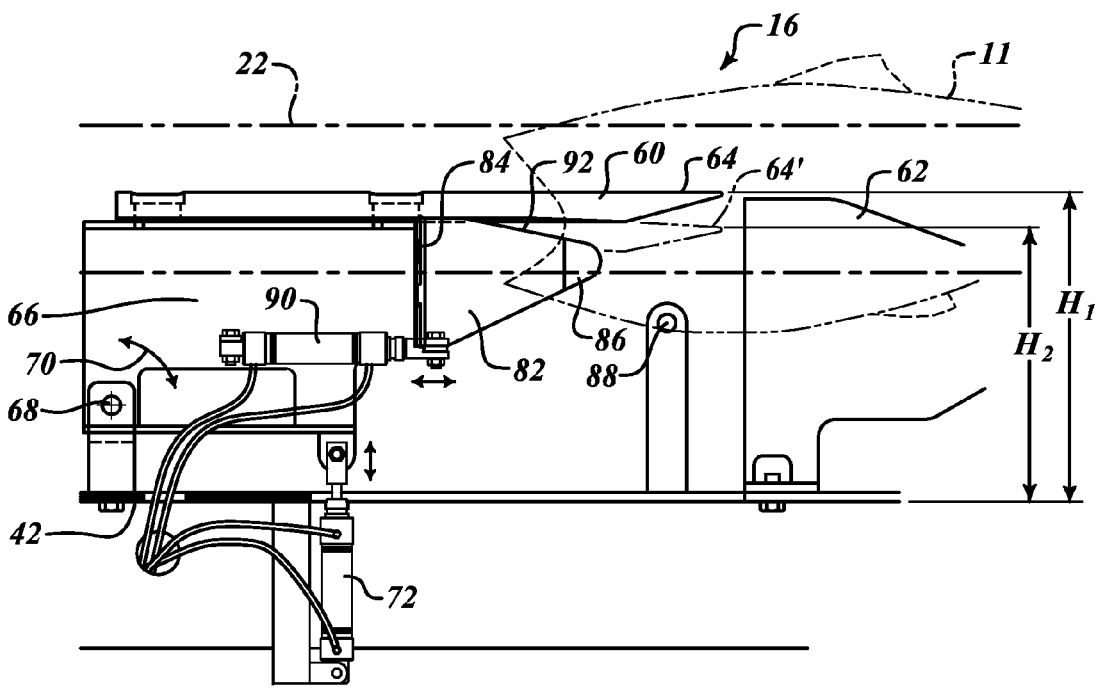
FIG. 7 is a side elevational view of the portion of the fish processing system of FIG. 6.
Figure 8:
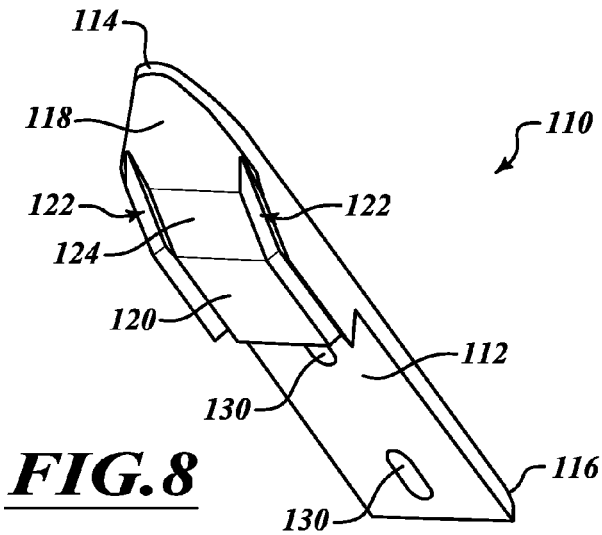
FIG. 8 is an isometric view of an extractor, according to one embodiment, usable with the fish processing system of FIGS. 1A and 1B.
Figure 9:
FIG. 9 is a front elevational view of the extractor of FIG. 8.
Figure 10:
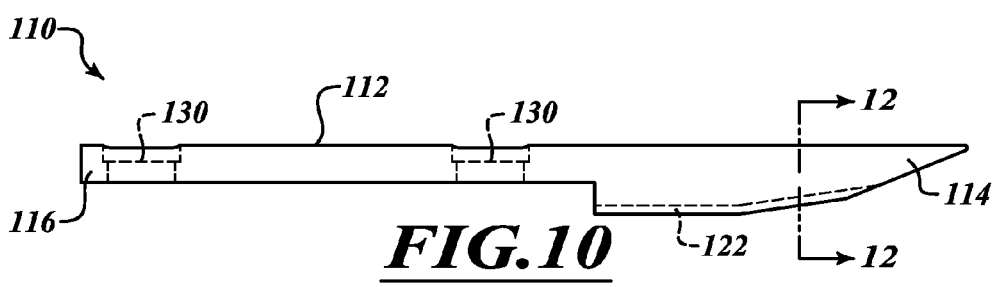
FIG. 10 is a side elevational view of the extractor of FIG. 8.
Figure 11:
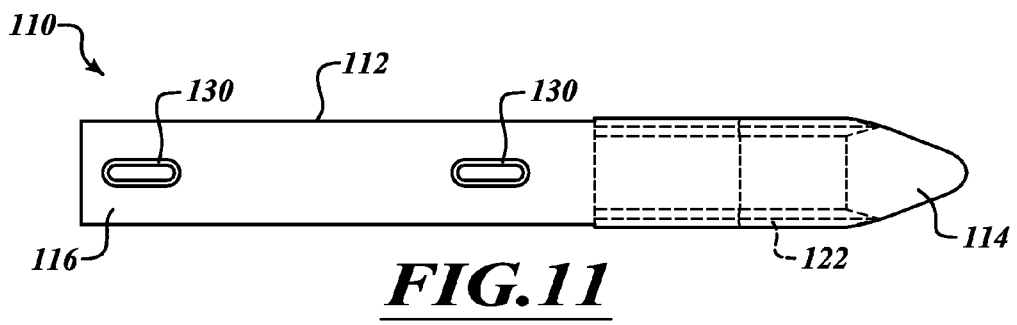
FIG. 11 is a top plan view of the extractor of FIG. 8.

As illustrated best in FIG. 7, the wing members 82 may be configured to transition from the closed configuration (FIGS. 4 and 5) to the open configuration (FIGS. 6 and 7) shortly after entering the fish 11. Movement of tension rollers engaging conveyor belts 22 which may be transporting the fish 11, a lever or other mechanism that senses or contacts the top of the fish 11 during transport, position sensors that sense or contact the collar or another part of the fish 11 during transport or other sensing and control devices may be positioned along the transport path of the fish 11 to determine a position of the fish 11 during the gutting operation and trigger the wing members 82 to move. For instance, a position sensor 88 may be positioned to sense a position of the fish 11 during the gutting operation and trigger the wing members 82 to transition from the closed configuration (FIGS. 4 and 5) to the open configuration (FIGS. 6 and 7). An actuator 90 may be coupled between the frame 66 and the wing members 82 for this purpose. The wing members 82 advantageously gather the viscera in a particularly nondestructive manner during the gutting operation. After gathering the viscera, the wing members 82 may transition back to the closed configuration (FIGS. 4 and 5) to assist in separating the viscera from the fish by severing the viscera in the intersection 92 between the wing members 82 and the extractor 60. Again, movement of the wing members 82 may be triggered by a variety of sensor and control devices. In addition, the movement of the wing members 82 may be coordinated with movement of the extractor 60, such as, for example, to occur simultaneously or sequentially.

After the viscera is removed by the gutting device 16, the remaining fish product 11 may be transported downstream for further processing and cleaning. For example, one or more kidney scrapers 98 (FIG. 1A) may be positioned downstream of the gutting device 16 to scrape or otherwise pierce the kidneys of the fish 11. The kidney scrapers 98 may be biased toward the underside of the fish to apply a predetermined amount of force to the fish 11 when scraping or piercing the kidneys. As another example, rotatable brushes 100 may be located downstream of the gutting device 16 to further clean the interior of the fish 11 as the fish pass over the rotatable brushes 100. Moreover, to prevent inadvertent rising of the fish 11 during the cleaning operation, additional hold down devices 102 may be positioned to bias the fish 11 downwardly as the fish 11 pass over the brushes 100. In some embodiments, fluid jets and/or suction devices may also be provided in combination with or in lieu of the brushes 100 to further clean the remaining fish product 11 during the cleaning operation. For example, the fish processing system 10 may include one or more suction head assemblies 104 (FIG. 1A), each positioned between adjacent brushes 100, as described in greater detail further below. After the fish product 11 is adequately gutted and cleaned, the fish product 11 may be discharged from the fish processing system 10 for packaging, or in some cases, further processing. The viscera, including the gonads, can also be discharged or collected for packaging or further processing.

FIGS. 8 through 12 illustrate one embodiment of an extractor 110 which is shaped in a particularly efficient and compact form factor to process fish 11 in a reliable and repeatable manner. The extractor 110 has a generally elongate body 112 which extends from a leading end or tip 114 to a trailing end 116. The leading end or tip 114 tapers toward a point and includes a convex upper surface to enter the fish 11 in a particularly nondestructive manner. The tip 114 is also inclined relative to a horizontal reference plane. In the illustrated embodiment, for example, the tip 114 inclines in two stages toward a horizontal surface 120 on the underside of the extractor 110. According to the illustrated embodiment, the incline includes two generally flat inclined surfaces 118, 124; however, it is contemplated that in other embodiments the inclined portion of the tip could be a single, flat inclined surface or could be a non-planar surface or non-planar surfaces.

The extractor 110 further includes downwardly open grooves 122 at opposing sides of the extractor 110 near the tip 114. The grooves 122 may have a v-shape (as illustrated), a u-shape or other shape cross-sectional profile. The grooves 122 are positioned relative to the tip 114 to assist in severing the gullet from the fish 11 during a gutting operation in a nondestructive manner.

The extractor 110 may also include slots 130, apertures or other features for securing the extractor 110 to a gutting device, such as the gutting devices 16 described herein. The slots 130 may allow for the extractor 110 to be adjusted fore and aft to interface, for example, with a guide 62 or other structure that feeds fish 11 toward the extractor 110. Also, the extractor 110 is interchangeably coupleable to the gutting device 16 to facilitate servicing or replacement.

Figure 12:
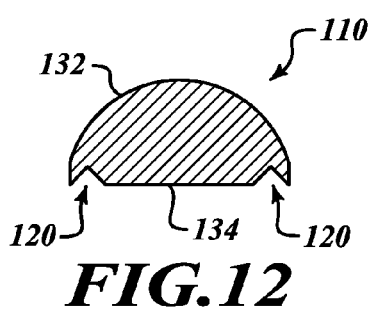
FIG. 12 is a cross-sectional view of the extractor of FIG. 8 taken along line 12-12 of FIG. 10.

With reference to FIG. 12, a cross-sectional profile of the tip 114 of the extractor 110 may include a profile having a central portion disposed between the opposing downwardly open grooves 122 when viewing the profile in a direction along a longitudinal length of the extractor 110. The profile may include an upper profile section 132 that is convex and a lower profile section 134 between the grooves 122 that is substantially linear. In this manner, the overall profile may generally resemble a D-shape or semicircular shape with opposing grooves 122 at the corners.

Figure 13:
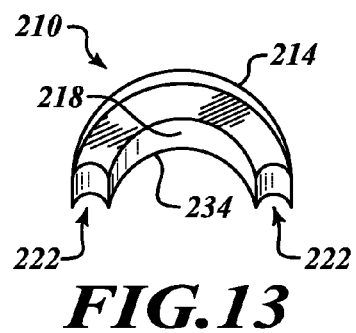
FIG. 13 is a front elevational view of an extractor, according to another embodiment, usable with the fish processing system of FIGS. 1A and 1B.

With reference to FIG. 13, another extractor 210 is shown having opposing downwardly open grooves 222 that are u-shaped. The tip 214 of the extractor 210 also includes a central inclined surface 218 that is concavely shaped. In this manner, a cross-sectional profile of the tip 214 may include an upper profile section that is convex and a lower profile section 234 between the grooves 222 that is arcuate, curvilinear or convex. The overall profile may generally resemble a bat wing. In other embodiments, the cross-sectional profile of a tip of the extractor may have other shapes, such as, for example, a D-shape with a saw tooth or scalloped lower profile section.

Figure 14:
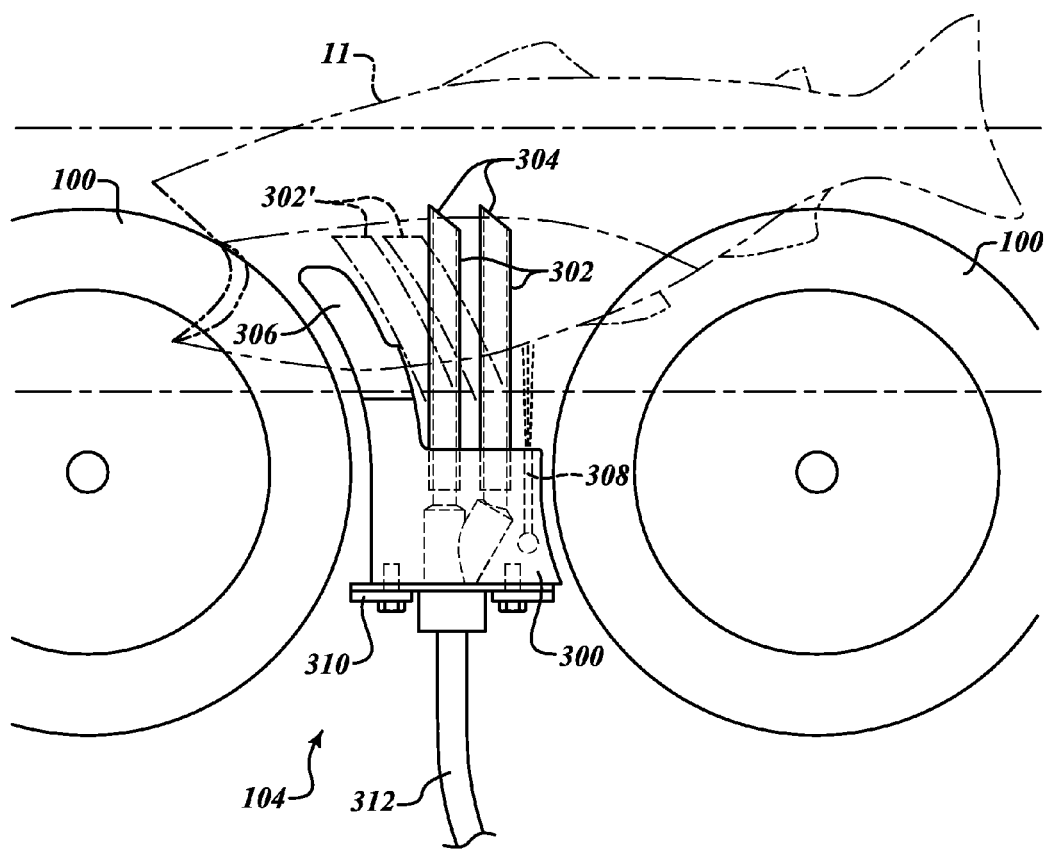
FIG. 14 is a side elevational view of a portion of the fish processing system of FIGS. 1A and 1B showing a vacuum head assembly thereof according to one embodiment.

FIG. 14 illustrates one embodiment of a suction head assembly 104 which is particularly well suited for cleaning an internal cavity of a fish 11 after the viscera of the fish 11 is removed. The suction head assembly 104 may be positioned downstream of a cutting device 14 (FIG. 1B) and gutting device 16 (FIG. 1B) to receive fish 11 which have been processed to remove the viscera, such as, for example, in the ways described above. In some embodiments, the suction head assembly 104 may be located between adjacent cleaning brushes 100 and configured in such a manner to suction material from the internal cavity of the fish 11 as the fish 11 passes across the suction head assembly 104 between the brushes 100. The suction head assembly 104 may be removably coupled to a mounting bracket 310 of the fish processing system 10 with fastener devices, such as, for example, threaded bolts.

As shown in the illustrated embodiment, the vacuum head assembly 104 may include one or more elongated flexible suction members 302, 302' extending from a main body 300 of the vacuum head assembly 104. The suction members 302, 302' may be tubular members, for example, of a semi-rigid material, such as, for example, various plastics. The suction members 302, 302' are positioned such that as a fish 11 passes over the vacuum head assembly 104, the suction members 302, 302' are caused to flex in the direction of travel in a response to the interaction with anatomy of the fish 11, as represented by the suction members 302' shown in broken lines. In this manner, the suction members 302, 302' may closely track an inner profile of the fish 11 and clean the fish 11 quite effectively during a cleaning operation. An end 304 of the suction members 302, 302' may be inclined such that the end 304 is oriented substantially parallel to surfaces of the internal cavity of the fish 11 as the suction members 302, 302' flex during the cleaning operation. The suction members 302, 302' may be positioned sequentially when more than one suction member 302, 302' is provided, such as, for example, as shown in the illustrated embodiment of FIG. 14.

The main body 300 of the suction head assembly 104 includes a suction cavity which is coupled to a vacuum source (not shown) and the one or more suction members 302, 302' via a conduit 312 to create a vacuum within the suction members 302, 302' to draw fluid and other matter from the internal cavity of the fish 11 during the cleaning operation. The main body 308 may further include a fluid jet passage 308 coupled to a water source or other source of cleaning solution or liquid (not shown) to discharge water or other cleaning solution or liquid into the cavity of the fish 11 as the fish 11 moves across the vacuum head assembly 104 during the cleaning operation. The fluid jet passage 308 may be positioned to direct fluid into the cavity slightly upstream of where the suction members 302, 302' interoperate with the fish 11 to assist in the cleaning operation.

The main body 300 of the vacuum head assembly 104 may also include a stop portion 306 to limit movement of the one or more suction members 302, 302' during the cleaning operation. For example, as shown in FIG. 14, a portion 306 of the main body 300 may be located downstream of the suction members 302, 302' and may be correspondingly shaped to a curvature of the suction members 302, 302' in a flexed position corresponding to a desired limit of travel. In this manner, the suction members 302, 302', may be oriented to clean the fish 11 in a particularly efficient manner throughout at least a substantial portion of the cleaning operation as the fish 11 passes over the vacuum head assembly 104. Various control and positioning mechanisms, such as, for example, hold down devices 102 (FIG. 1A) may be positioned to bias the fish 11 downwardly as the fish 11 pass over the vacuum head assembly 104. In some embodiments, a fluid jet passage 308 may not be provided or may be provided in a separate device remote from the main body 300. In some embodiments, sensors and other control mechanisms may be provided to activate the suction of the suction head assemblies 104 and/or the fluid jet discharged from the fluid jet passage 308 in response to a location of the fish 11 as it moves toward and across the vacuum head assembly 104 during operation.

Although many aspects of the fish processing systems 10 and methods described herein are discussed in the context of an integrated system for processing fish in a particularly efficient and reliable manner, it is appreciated that aspects may be applied to a wide range of fish processing systems, subsystems and other devices. For example, the cutting devices 14 and gutting devices 16 described herein may be freestanding units or may be integrated into various other processing systems having a variety of capabilities. As another example, the extractors 60, 110, 210 and cleaning head assemblies 104 described herein may be incorporated into other known fish processing devices with little or no modification to such systems.

Still further, although the fish processing systems and methods described herein are discussed in the context of producing head and gut product, it is appreciated that upon review and study of the present disclosure, it will be apparent to those of ordinary skill in the art that aspects of the various embodiments described herein may be modified to process fish in which the head of the fish is only partially cut from the fish body.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fish processing system, comprising:
   a blade to incise a belly of a fish when the fish is transported from an upstream location across the blade; and
   a gutting device positioned downstream of the blade, the gutting device including
      an extractor to sever a gullet from a collar of the fish, the extractor movably coupled to the fish processing system to selectively position a tip of the extractor relative to anatomy of the fish during a gutting operation, the extractor configured to enter a head end of the fish at a first height below a backbone and above the gullet of the fish and exit at a tail end of the fish at a second height that is lower than the first height,
      an actuator coupled to the extractor to move the extractor between the first height and the second height during the gutting operation,
      a sensor positioned to sense a location of the fish during the gutting operation and trigger the actuator to move the extractor, and
      a pair of opposing wing members configured to move between an open configuration and a closed configuration, wherein movement of the wing members is coordinated with movement of the extractor to transition from the closed configuration to the open configuration after the extractor enters the fish and a leading edge of each respective wing member is near a collar of the fish.

2. The fish processing system of claim 1 wherein the second height is substantially aligned with an anal vent of the fish.

3. The fish processing system of claim 1 wherein the extractor is configured to automatically move from the first height to the second height during an interval in which the tip of the extractor moves through a length of the fish during the gutting operation.

4. The fish processing system of claim 1 wherein, when viewing the extractor in a direction along a longitudinal length thereof, a profile of the tip of the extractor includes a central portion disposed between opposing downwardly open grooves.

5. The fish processing system of claim 4 wherein the opposing downwardly opposing grooves of the extractor are positioned to assist in severing a gullet of the fish from a collar of the fish without significant damage to the collar.

6. The fish processing system of claim 1 wherein the wing members are further configured to move from the open configuration toward the closed configuration to assist in severing the viscera from the fish prior to when the wing members exit the fish.

7. The fish processing system of claim 1, further comprising:
   a guide positioned to be inserted into a body of the fish to guide the position of the fish as the belly is cut by the blade during a cutting operation; and
   a linkage mechanism coupled to the guide and the blade, the linkage mechanism configured to enable the guide to move in response to a profile of the fish without substantial angular rotation of the guide as the guide moves through a length of the fish during the cutting operation.

8. The fish processing system of claim 1, further comprising:
   a vacuum head assembly positioned downstream of the gutting device to clean a cavity of the fish after the gutting operation, the vacuum head assembly including at least one flexible suction member located to flex in response to the anatomy of the fish as the fish moves across the vacuum head assembly during a cleaning operation.

9. The fish processing system of claim 8 wherein the vacuum head assembly further includes a fluid jet passage to discharge fluid into the cavity of the fish as the fish moves across the vacuum head assembly during the cleaning operation.

10. The fish processing system of claim 8 wherein the vacuum head assembly further includes a body having a stop portion to limit movement of the at least one flexible suction member during the cleaning operation.

11. The fish processing system of claim 8 wherein the vacuum head assembly includes at least two sequentially positioned suction members to clean the cavity of the fish during the cleaning operation.

12. The fish processing system of claim 7 wherein the linkage mechanism is configured to limit the angular rotation of the guide to five degrees or less as the guide moves through the length of the fish during the cutting operation.

13. The fish processing system of claim 7 wherein the linkage mechanism is configured to maintain the guide at the same spatial orientation as the guide moves through the length of the fish during the cutting operation.

14. The fish processing system of claim 7 wherein the linkage mechanism includes a pair of links which operate in a parallel relationship throughout movement of the guide during the cutting operation.

15. A fish processing system, comprising:
a blade to incise a belly of a fish when the fish is transported from an upstream location across the blade; and
a gutting device positioned downstream of the blade, the gutting device including
an extractor to sever a gullet from a collar of the fish, the extractor movably coupled to the fish processing system to selectively position a tip of the extractor relative to anatomy of the fish during a gutting operation, the extractor entering a head end of the fish at a first height below a backbone and above the gullet of the fish and exiting at a tail end of the fish at a second height that is lower than the first height,
an actuator coupled to the extractor to move the extractor between the first height and the second height during the gutting operation,
a sensor positioned to sense a location of the fish during the gutting operation and trigger the actuator to move the extractor, and
a pair of opposing wing members that move between an open configuration and a closed configuration, wherein movement of the wing members is coordinated with movement of the extractor to transition from the open configuration to the closed configuration at about the same time when the extractor moves from the first height to the second height which is lower than the first height.

16. A fish processing system, comprising:
a blade to incise a belly of a fish when the fish is transported from an upstream location across the blade; and
a gutting device positioned downstream of the blade, the gutting device including
an extractor to sever a gullet from a collar of the fish, the extractor movably coupled to the fish processing system to selectively position a tip of the extractor relative to anatomy of the fish during a gutting operation, the extractor entering a head end of the fish at a first height below a backbone and above the gullet of the fish and exiting at a tail end of the fish at a second height that is lower than the first height,
an actuator coupled to the extractor to move the extractor between the first height and the second height during the gutting operation,
a sensor positioned to sense a location of the fish during the gutting operation and trigger the actuator to move the extractor, and
a pair of opposing wing members that move between an open configuration and a closed configuration, wherein movement of the wing members is coordinated with movement of the extractor to transition from the open configuration to the closed configuration after the extractor moves from the first height to the second height which is lower than the first height.

17. A fish processing system, comprising:
a blade to incise a belly of a fish when the fish is transported from an upstream location across the blade; and
a gutting device positioned downstream of the blade, the gutting device including a pair of opposing wing members movable between an open configuration and a closed configuration, the wing members each including a free end that enters the fish in the closed configuration and thereafter moves to the open configuration when a leading edge of each respective wing member is near a collar of the fish to gather viscera of the fish during a gutting operation.

18. The fish processing system of claim 17 wherein the wing members are further configured to move from the open configuration toward the closed configuration to assist in severing the viscera from the fish prior to when the wing members exit the fish.

19. The fish processing system of claim 17 wherein movement of the wing members is coordinated with movement of an extractor of the gutting device which is positioned to sever a gullet from the fish during the gutting operation.

20. The fish processing system of claim 17 wherein the pair of opposing wing members are configured to move to the open configuration at a head end of the fish to spread opposing sides of the fish.

21. The fish processing system of claim 17 wherein the gutting device further includes an actuator coupled to the pair of opposing wing members to move the wing members between the closed configuration and the open configuration during the gutting operation.

22. The fish processing system of claim 21 wherein the gutting device further includes a sensor positioned to sense a location of the fish during the gutting operation and trigger the actuator to move the wing members.

23. The fish processing system of claim 17 wherein the gutting device further includes an extractor to sever a gullet from a collar of the fish, the extractor movable to position a tip of the extractor relative to anatomy of the fish during a gutting operation and being configured to enter a head end of the fish at a first height below a backbone and above the gullet of the fish and exit at a tail end of the fish at a second height that is lower than the first height.

24. The fish processing system of claim 23 wherein the gutting device further includes an actuator coupled to the extractor to move the extractor between the first height and the second height during the gutting operation.

25. The fish processing system of claim 24 wherein the gutting device further includes a sensor positioned to sense a location of the fish during the gutting operation and trigger the actuator to move the extractor.

26. The fish processing system of claim 23 wherein movement of the wing members is coordinated with movement of the extractor to transition from the closed configuration to the open configuration after the extractor enters the fish.

27. The fish processing system of claim 23 wherein movement of the wing members is coordinated with movement of the extractor to transition from the open configuration to the closed configuration at about the same time when the extractor moves from the first height to the second height.

28. The fish processing system of claim 23 wherein movement of the wing members is coordinated with movement of the extractor to transition from the open configuration to the closed configuration after the extractor moves from the first height to the second height.

* * * * *